US007007847B2

(12) United States Patent
Iwaguchi et al.

(10) Patent No.: US 7,007,847 B2
(45) Date of Patent: Mar. 7, 2006

(54) BAR-CODE READER AND METHOD OF READING BAR-CODE

(75) Inventors: Isao Iwaguchi, Tokyo (JP); Hideo Miyazawa, Tokyo (JP); Mitsuo Watanabe, Tokyo (JP); Kozo Yamazaki, Tokyo (JP); Masanori Ohkawa, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 208 days.

(21) Appl. No.: 10/750,876

(22) Filed: Jan. 5, 2004

(65) Prior Publication Data

US 2004/0164159 A1    Aug. 26, 2004

(30) Foreign Application Priority Data

Feb. 21, 2003  (JP)  ............................. 2003-045083

(51) Int. Cl.
G06K 7/10  (2006.01)
G06K 19/06  (2006.01)
(52) U.S. Cl. .............................. 235/462.16; 235/462.25
(58) Field of Classification Search .......... 235/462.16, 235/462.17, 462.25
See application file for complete search history.

(56) References Cited

U.S. PATENT DOCUMENTS

| 3,886,521 | A | * | 5/1975 | Dobras ........................ 235/437 |
| 5,210,397 | A | | 5/1993 | Eastman |
| 5,302,814 | A | * | 4/1994 | Kawabata ............... 235/462.18 |
| 5,329,105 | A | * | 7/1994 | Klancnik et al. ...... 235/462.16 |
| 5,401,949 | A | * | 3/1995 | Ziemacki et al. ...... 235/462.16 |
| 5,514,858 | A | * | 5/1996 | Ackley ................... 235/462.16 |
| 5,767,497 | A | * | 6/1998 | Lei ........................ 235/462.16 |
| 5,767,498 | A | * | 6/1998 | Heske et al. ........... 235/462.16 |
| 5,811,782 | A | * | 9/1998 | Sato et al. ............. 235/462.01 |
| 5,965,864 | A | * | 10/1999 | Iwaguchi et al. ...... 235/462.25 |
| 6,012,640 | A | * | 1/2000 | Liu ........................ 235/462.25 |
| 6,299,064 | B1 | * | 10/2001 | Watanabe et al. ...... 235/462.16 |
| 6,357,660 | B1 | * | 3/2002 | Watanabe et al. ...... 235/462.16 |

FOREIGN PATENT DOCUMENTS

| JP | 55-143682 | | 11/1980 |
| JP | 56-17474 | | 2/1981 |
| JP | 62-214366 | | 9/1987 |
| JP | 1-156886 A | * | 6/1989 |
| JP | 5-101212 | | 4/1993 |
| JP | 6-342478 | | 12/1994 |
| JP | 7-152852 | | 6/1995 |

* cited by examiner

Primary Examiner—Jared J. Fureman
(74) Attorney, Agent, or Firm—Armstrong, Kratz, Quintos, Hanson & Brooks, LLP

(57) ABSTRACT

A signal obtained by optically scanning a bar code is subjected to differentiation to obtain differential data. Peak-to-peak distances are calculated from the differential data. When a peak-to-peak $\Delta Tx$ distance is y times of a basic width, frequency $f(x,y)$ will be, $f(x,y)=y/\Delta Tx$. A frequency map is prepared from the frequencies calculated. Transition routes in which one frequency each is selected from each of the peak-to-peak distances, are formed. A transition route for which an error in frequencies is the least is taken as the most suitable transition route. An average of the frequencies included in the transition route is taken as a frequency $f0$ of the basic width.

13 Claims, 9 Drawing Sheets

| | WIDTH NUMBER = 2 | WIDTH NUMBER = 3 | WIDTH NUMBER = 4 | WIDTH NUMBER = 5 | | WIDTH NUMBER = x |
|---|---|---|---|---|---|---|
| $\Delta T1$ | f(1,2) | f(1,3) | f(1,4) | f(1,5) | | f(1,x) |
| $\Delta T2$ | f(2,2) | f(2,3) | f(2,4) | f(2,5) | | f(2,x) |
| $\Delta T3$ | f(3,2) | f(3,3) | f(3,4) | f(3,5) | | f(3,x) |
| | | | | | | |
| | | | | | | |
| | | | | | | |
| | | | | | | |
| | | | | | | |
| | | | | | | |
| | | | | | | |
| $\Delta Tm-1$ | f(m-1,2) | f(m-1,3) | f(m-1,4) | f(m-1,5) | | f(m-1,x) |

BAR-CODE READER AND METHOD OF READING BAR-CODE

BACKGROUND OF THE INVENTION

1) Field of the Invention

The present invention relates to a bar-code reader and a method of reading the bar code to determine a basic width of the bar code.

2) Description of the Related Art

Products are managed by providing a bar code to the product and identifying the product by reading this bar code optically. Since the bar code labels can be prepared at a low cost by printing etc., by using such bar code labels, it is possible to reduce the management cost substantially.

The bar-code labels attached to the products are read using a bar code reader. Such a bar code reader generally includes an optical system like a laser reader, a charged coupled device (CCD) camera etc. The bar code reader receives light that is reflected from a bar code label, determines a pattern of the white lines and the black lines in the bar code from the optical power of the light reflected, and then decodes this pattern to obtain character data that is a pattern of numerals and characters. Such a bar code reader has been disclosed in, for example, Japanese Patent Application Laid-open Application No. S55-143682.

The accuracy of reading of a bar code varies according to the position of receiving of the reflected light, i.e. the position of the photodiode. Thus, the position of the photodiode is an important factor that decides the accuracy.

Generally the conventional bar-code readers are equipped with a single circuit board and a photodiode that receives the light that is reflected from a bar-code label and an arithmetic unit that decodes the bar code are installed on this circuit board. When the photodiode is installed on the circuit board along with the arithmetic unit or other components, the positions where the photodiode can be installed are limited so that sometimes the photodiode cannot be installed in a suitable position that allows increased accuracy of reading. If the photodiode is not installed in the suitable position, there is a decline in the accuracy.

Widths of the bars in a bar code are regulated to be an integral multiple of a basic width. When a bar code is decoded, the multiple numbers (hereinafter, "width number") for each bar is determined. Therefore, the basic width must be determined accurately, because, the accuracy of reading of a bar code depends on how accurate is the basic width.

However, in conventional bar-code readers, there are cases where the basic width of a bar code cannot be calculated accurately, thereby resulting in decline in the accuracy of reading.

For example, a method of calculating has been used conventionally in which a differential waveform is formed by differentiating a scan result of a bar code and the basic width is calculated from a distance between peaks (hereinafter peak-to-peak distance) of the differential waveform. However, this method was based on an assumption that all the peaks can be acquired and when a peak corresponding to a bar having a small width number cannot be detected, a greater value as compared to the original basic width is calculated as the basic width.

Concretely, for example, when a diameter of a laser beam is greater as compared to a bar that has a width number 1, the peak value corresponding to a white bar and a black bar having a width number 1, is smaller as compared to the peak value of a bar that has a width number not less than 2. As a result of this, if the peak value corresponding to a bar having a width number 1 is less than a threshold value, the peak of a spectrum that is detected is only the peak corresponding to a bar that has a width number not less than 2. Thus, when a peak that corresponds to a bar having a width number 1 cannot be detected, in the conventional bar-code reader, a width that is equivalent to a width number not less than 2 is miscalculated as a basic width.

Moreover, in a method of calculating the basic width, a waveform in which a differential waveform of a scan result is squared, is subjected to fast Fourier transform (FFT). After the transformation, a frequency from the spectrum that becomes a gain peak is considered as the basic width frequency. However, if this method is employed, while reading an area where the beam diameter is thick, amplitude of the basic width frequency becomes extremely small and a false gain peak frequency that is greater than the gain in the real basic width frequency is realized. Due to this, the basic-width frequency cannot be extracted correctly.

Particularly, when the distance between a laser element and a bar code is long, the outward diameter of laser beam becomes large, thereby resulting in remarkable decline in the accuracy of reading. Therefore, in the conventional bar-code readers, it is necessary that the bar code be brought near to the position of laser emission. In other words, in the conventional bar-code readers, the range of bar-code reading was narrow.

SUMMARY OF THE INVENTION

It is an object of the present invention to provide a technology to accurately determine the basic width.

A bar-code reader according to one aspect of the present invention scans a bar code that is formed by black bars and white bars each having a width that is an integral multiple of a basic width. This bar code includes a differential processing unit that calculates differential of a signal obtained by optically scanning the bar code to thereby obtain a differential data; a peak detector that detects peaks in the differential data; a peak-to-peak distance calculating unit that calculates peak-to-peak distances for all the peaks detected, the peak-to-peak distance being a distance between two adjacent peaks; a frequency-mapping unit that calculates, for each of the peak-to-peak distances, candidate values for the basic width by dividing the corresponding one of the peak-to-peak distance by each of a plurality of integral numbers that are possible candidates for the integral numbers respectively; a transition-route forming unit that selects, based on a predetermined criteria, a candidate value for the basic width corresponding to each of the peak-to-peak distances to thereby form a combination pattern for each candidate values of the basic width; an error judging unit that judges an mount of error in each of the combination patterns, and determines a combination pattern, as a candidate combination pattern, having least amount of error from among the combination patterns; and a basic-width determining unit that calculates the basic width from the candidate values for the basic width in the candidate combination pattern.

A method of reading a bar code according to another aspect of the present invention is a method of scanning the bar code that is formed by black bars and white bars each having a width that is an integral multiple of a basic width. This method includes calculating differential of a signal obtained by optically scanning the bar code to thereby obtain a differential data; detecting peaks in the differential data; calculating peak-to-peak distances for all the peaks detected, the peak-to-peak distance being a distance between two adjacent peaks; calculating, for each of the peak-to-peak distances, candidate values for the basic width by dividing the corresponding one of the peak-to-peak distance by each of a plurality of integral numbers that are possible candidates for the integral numbers respectively; selecting, based on a predetermined criteria, a candidate value for the basic width corresponding to each of the peak-to-peak distances to thereby form a combination pattern for each candidate values of the basic width; judging an mount of error in each of the combination patterns, and determining a combination pattern, as a candidate combination pattern, having least amount of error from among the combination patterns; calculating the basic width from the candidate values for the basic width in the candidate combination pattern.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 5 is an illustration of a frequency table;

DETAILED DESCRIPTION

Exemplary embodiments of a bar-code reader and a method of reading the bar code according to the present invention are explained in detail below with reference to the accompanying diagrams.

Figure 1:
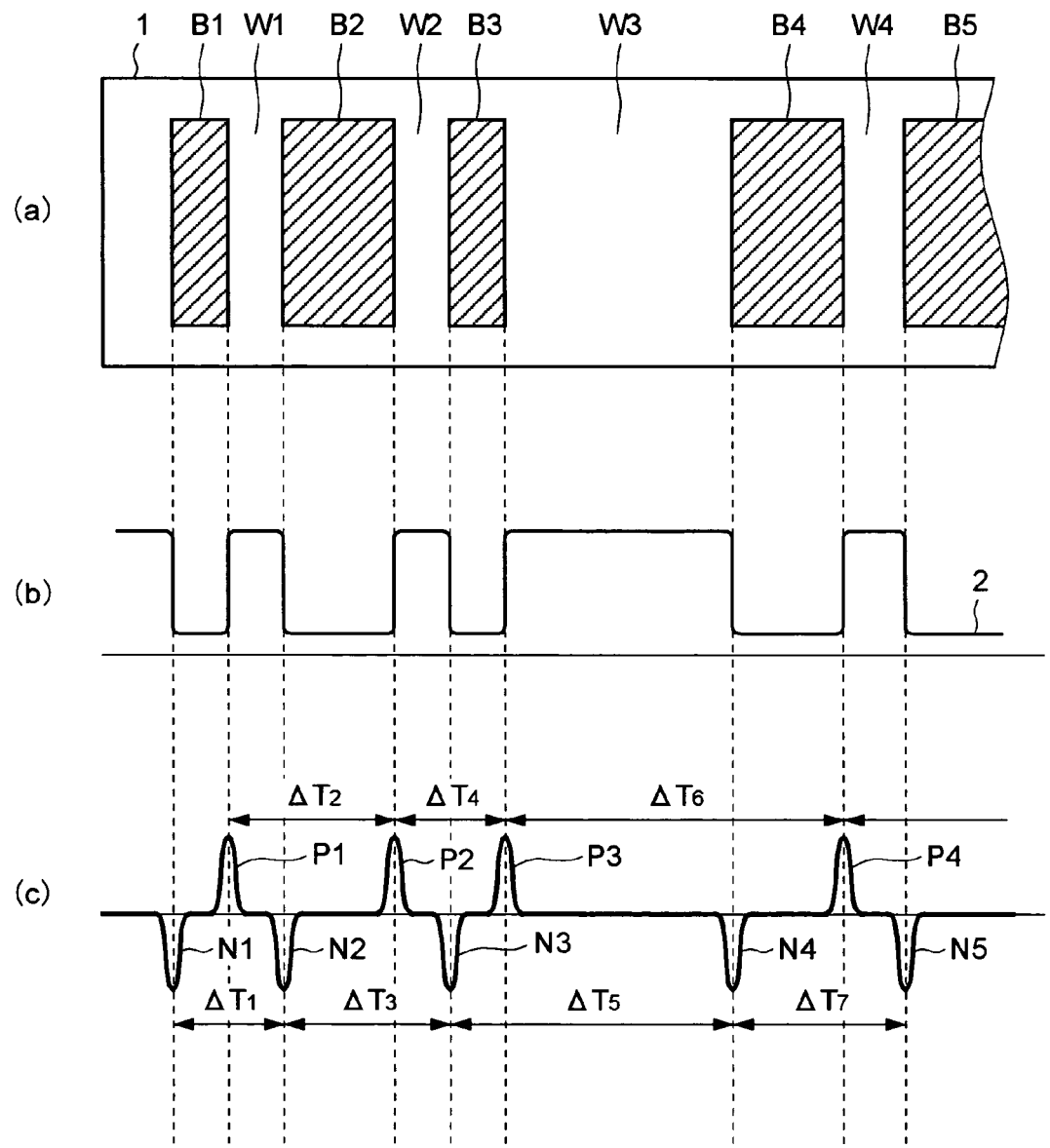
FIG. 1 is an illustration of the concept of a scan data.

A concept of a method of reading a bar code related to the present invention is described with reference to FIG. 1 and FIG. 2. FIG. 1 is an illustration of the concept of a scan data acquired by scanning a bar code. As illustrated in part (a) of FIG. 1, a bar code 1 includes alternately arranged black bars B1 to B5 and white bars W1 to W4.

The width of each of the black and white bars is an integral multiple (width number) of a basic width f0. The width of each of the black bars B1 and B3, and the white bars W1, W2, and W4 is same as the basic width f0, in other words, a width number of each of the black bars B1 and B3, and the white bars W1, W2, and W4 is 1. The width of each of the black bars B2 and B4 two times of the basic width f0, in other words, a width number of each of the black bars B2 and B4 is 2. Similarly, a width number of the white bar W3 is 4.

When a laser beam is irradiated on this bar code, if the laser beam is irradiated on a black bar, the optical power of the reflected light is low, and if the laser beam is irradiated on a white bar, the optical power of the reflected light is high. Part (b) in FIG. 1 illustrates a scan data 2, that is, optical power, obtained when the bar code 1 is read. The optical power is low for the black bars B1 to B5 and high for the white bars W1 to W4.

Part (c) in FIG. 1 illustrates a differential data 3 obtained by differentiating the scan data 2. The differential data 3 has negative peaks n1 to n5 at the boundaries between white bars and black bars and positive peaks p1 to p6 at the boundaries between black bars and white bars.

From the differential data 3, peak-to-peak distances $\Delta T1$ to $\Delta T7$ between the positive peaks p1 to p6 and the negative peaks n1 to n5 are calculated. The peak-to-peak distance $\Delta T1$ is a distance from the negative peak n1 to the negative peak n2 and the peak-to-peak distance $\Delta T2$ is a distance from the positive peak p1 to the positive peak p2. Moreover, the peak-to-peak distance $\Delta T3$ is a distance from the negative peak n2 to the negative peak n3 and the peak-to-peak distance $\Delta T4$ is a distance from the positive peak p2 to the positive peak p3.

Similarly, the peak-to peak distance $\Delta T5$ is a distance from the negative peak n3 to the negative peak n4 and the peak-to-peak distance $\Delta T6$ is a distance from the positive peak p3 to the positive peak p4. Furthermore, the peak-to-peak distance $\Delta T7$ is a distance from the negative peak n4 to the negative peak n5.

The widths of bars can be calculated from these peak-to-peak distances $\Delta T1$ to $\Delta T7$. For example, the peak-to-peak distance $\Delta T1$ is a total of the width of the black bar B1 and the width of the white bar W1, the peak-to-peak distance $\Delta T2$ is a total of the width of the white bar W1 and the width of the black bar B2. The peak-to-peak distance $\Delta T3$ is a total of the width of the black bar B2 and the width of the white bar W2 and the peak-to-peak distance $\Delta T4$ is a total of the width of the white bar W2 and the width of the black bar B3. Similarly, the peak-to-peak distance $\Delta T5$ is a total of the width of the black bar B3 and the width of white bar W3 and the peak-to-peak distance $\Delta T6$ is a total of the width of the white bar W3 and the width of the black bar B4. Moreover, the peak-to-peak distance $\Delta T7$ is a total of the width of the black bar B4 and the width of the white bar W4.

Thus, since the peak-to-peak distances $\Delta T1$ to $\Delta T7$ are the totals of widths of the black bars and the white bars, the values of the peak-to-peak distances $\Delta T1$ to $\Delta T7$ are integral multiples not less than twice the basic width. Therefore, by dividing each peak-to-peak distance by a value that is obtained as a width number, a candidate value for the basic width corresponding to each peak-to-peak distance can be calculated.

For example, if the peak-to-peak distance value $\Delta T1$ is a width number 2, the candidate value for the basic width becomes $\Delta T1/2$ and if we assume that the peak-to-peak value $\Delta T1$ is a width number 3, the candidate value for the basic width becomes $\Delta T1/3$.

Thus, upon calculating the candidate value for the basic width for each peak-to-peak distance, the candidate value that appears in common for each peak-to-peak distance is obtained. By adopting this candidate value for the basic width that appears in common as the basic width, all the peak-to-peak distances can be expressed as integral multiples of the basic width.

The peak-to-peak distances $\Delta T1$ to $\Delta T7$ are represented as time widths in the differential data 3. Therefore, while calculating the candidate value for the basic width, frequency that is a reciprocal of the time width may be used.

Figure 2:
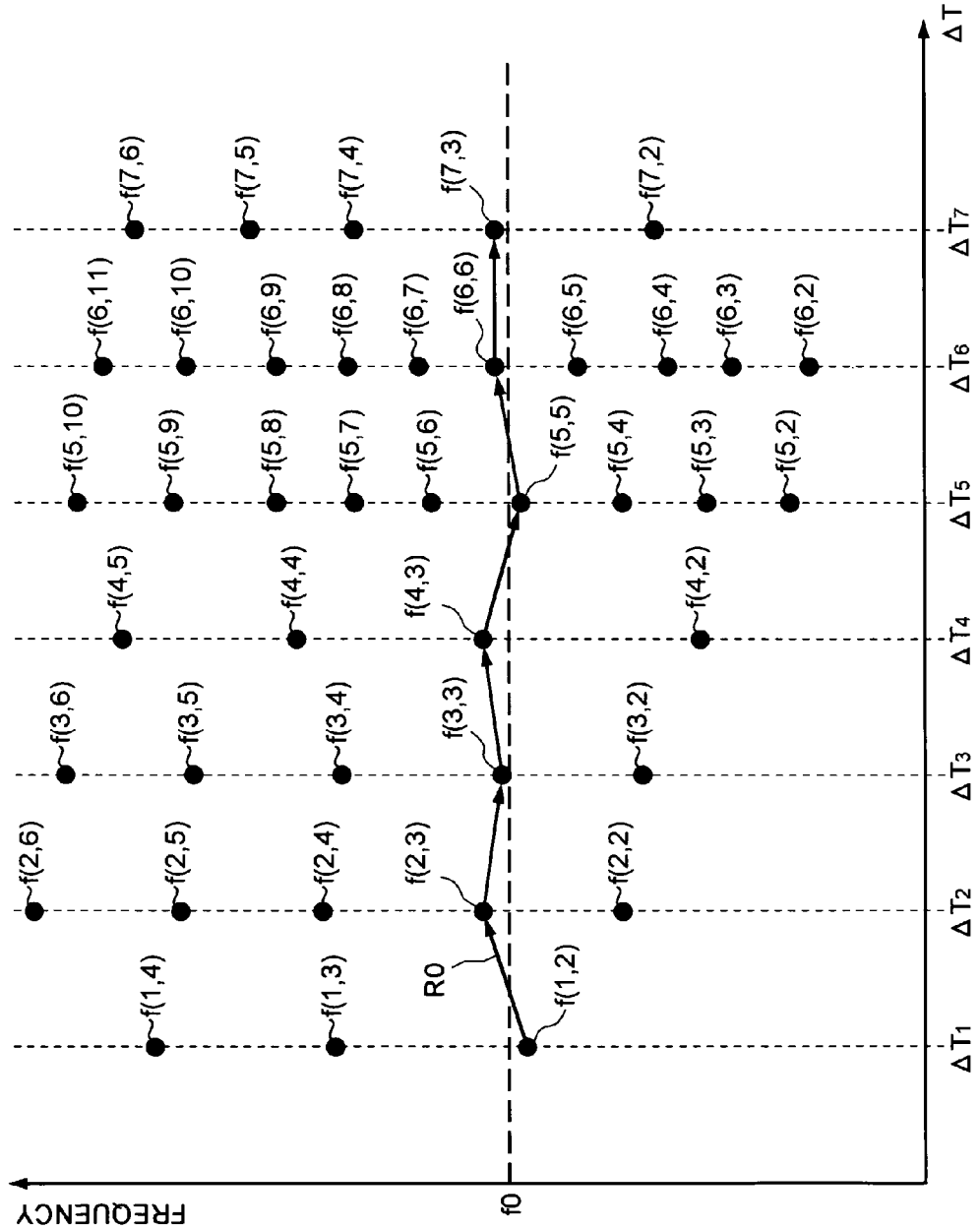
FIG. 2 is an illustration of candidate values of a basic width of each peak-to-peak distance.

The calculation of the candidate value for the basic width is described by referring to FIG. 2. FIG. 2 is an illustration of candidate values for the basic width of each peak-to-peak distance. Frequency f(x, y) illustrated in FIG. 2 is a function that is denoted by $$f(x,y)=y/\Delta Tx.$$

In other words, the frequency f(x, y) is a frequency corresponding to the candidate value for the basic width under the assumption that the peak-to-peak distance ΔTx has a width number y.

Frequencies f(1, 2), f(1, 3), f(1, 4) are calculated corresponding to the peak-to-peak distance ΔT1. Further, frequencies f(2, 2), f(2, 3), f(2, 4), f(2, 5), and f(2, 6) are calculated corresponding to the peak-to-peak distance ΔT2, and frequencies f(3, 2), f(3, 3), f(3, 4), f(3, 5), and f(3, 6) are calculated corresponding to the peak-to-peak distance ΔT3.

Similarly, frequencies f(4, 2), f(4, 3), f(4, 4), f(4, 5) are calculated corresponding to the peak-to-peak distance ΔT4 and frequencies f(5, 2), f(5, 3), f(5, 4), f(5, 5), f(5, 6), f(5, 7), f(5, 8), f(5, 9), and f(5, 10) are calculated corresponding to the peak-to-peak distance ΔT5.

Moreover, frequencies f(6, 2), f(6, 3), f(6, 4), f(6, 5), f(6, 6), f(6, 7), f(6, 8), f(6, 9), f(6, 10), and f(6, 11) are calculated corresponding to the peak-to-peak distance ΔT6, and frequencies f(7, 2), f(7, 3), f(7, 4), f(7, 5), and f(7, 6) are calculated corresponding to the peak-to-peak distance ΔT7.

Thus, upon calculating the frequencies corresponding to the candidate values for the basic width for the peak-to-peak distances ΔT1 to ΔT7 respectively, a frequency that appears in common to the peak-to-peak distances ΔT1 to ΔT7 is calculated. Concretely, one value of frequency from the peak-to-peak distances ΔT1 to ΔT7 each, is selected and combined to form combination patterns. Among these combination patterns, a pattern in which frequency error in the pattern is the least is assumed to be the most suitable combination pattern and an average of frequencies in the most suitable combination pattern is calculated.

In this case, what is required finally is the most suitable combination pattern for which the frequency error in the pattern is the least. Therefore, to start with, one frequency is selected from the peak-to-peak distance ΔT1 and a frequency that is nearest to the frequency that is selected from the peak-to-peak distance ΔT1 is selected from the peak-to-peak distance ΔT2. Further, a frequency that is nearest to the frequency that is selected from the peak-to-peak distance ΔT(x−1) is selected from the peak-to-peak distance ΔTx and a transition route is formed, thereby enabling to obtain the most suitable pattern, efficiently. The transition route may be formed by considering the width number 2 as the origin. The width number 2 is the least width number in the peak-to-peak distance. If it is assumed that the transition route is formed by taking the peak-to-peak distance of width number not less than 3 as a width number 2, no suitable frequency is obtained in any one of the peak-to-peak distances that has the original width number 2. Therefore, this transition route can be judged to be unsuitable. Further, by forming a transition route with frequency not less than width number 3 as the origin, a transition route for each width number can be calculated.

A transition route R0 obtained by selecting the frequencies is illustrated in FIG. 2. This transition route R0 includes frequency f(1, 2) corresponding to the peak-to-peak distance ΔT1, frequency f(2, 3) that is nearest to the frequency f(1, 2) among frequencies of the a peak-to-peak distance ΔT2, frequency f(3, 3) that is nearest to the frequency f(2, 3) among frequencies of a peak-to-peak distance ΔT3, frequency f(4, 3) that is nearest to the frequency f(3, 3) among frequencies of a peak-to-peak distance ΔT4, frequency f(5, 5) that is nearest to the frequency f(4, 3) among frequencies of a peak-to-peak distance ΔT5, frequency f(6, 6) that is nearest to the frequency f(5, 5) among frequencies of a peak-to-peak distance ΔT6, and frequency f(7, 3) that is nearest to the frequency f(6, 6) among frequencies of a peak-to-peak distance ΔT7.

Transition routes with each frequency of the peak-to-peak distance ΔT1 as the origin are formed similarly as the transition route R0. Frequency error for the frequency selected for each transition route is calculated. If an error of the transition route R0 is the least as a result of a comparison of the errors for each transition route, an average of frequencies f(1, 2), f(2, 3), f(3, 3), f(4, 3), f(5, 5), f(6, 6), and f(7, 3) in the transition route R0 is calculated and the average is output as a basic width frequency f0. Since the basic width frequency f0 is a reciprocal of the basic width, the basic width can be calculated by 1/f0.

Thus, in the method of reading a bar-code according to the present invention, a peak-to-peak distance is calculated from differential data of the scan result. Widths that are acquired by the respective peak-to-peak distances are assumed and candidate values for the basic width are calculated. A transition route of the candidate values for the basic width is formed and an average value of the candidate values for the basic width included in a transition route that has the least error is adopted as the basic width. Thus, the basic width of the bar code can be calculated accurately.

Figure 3:
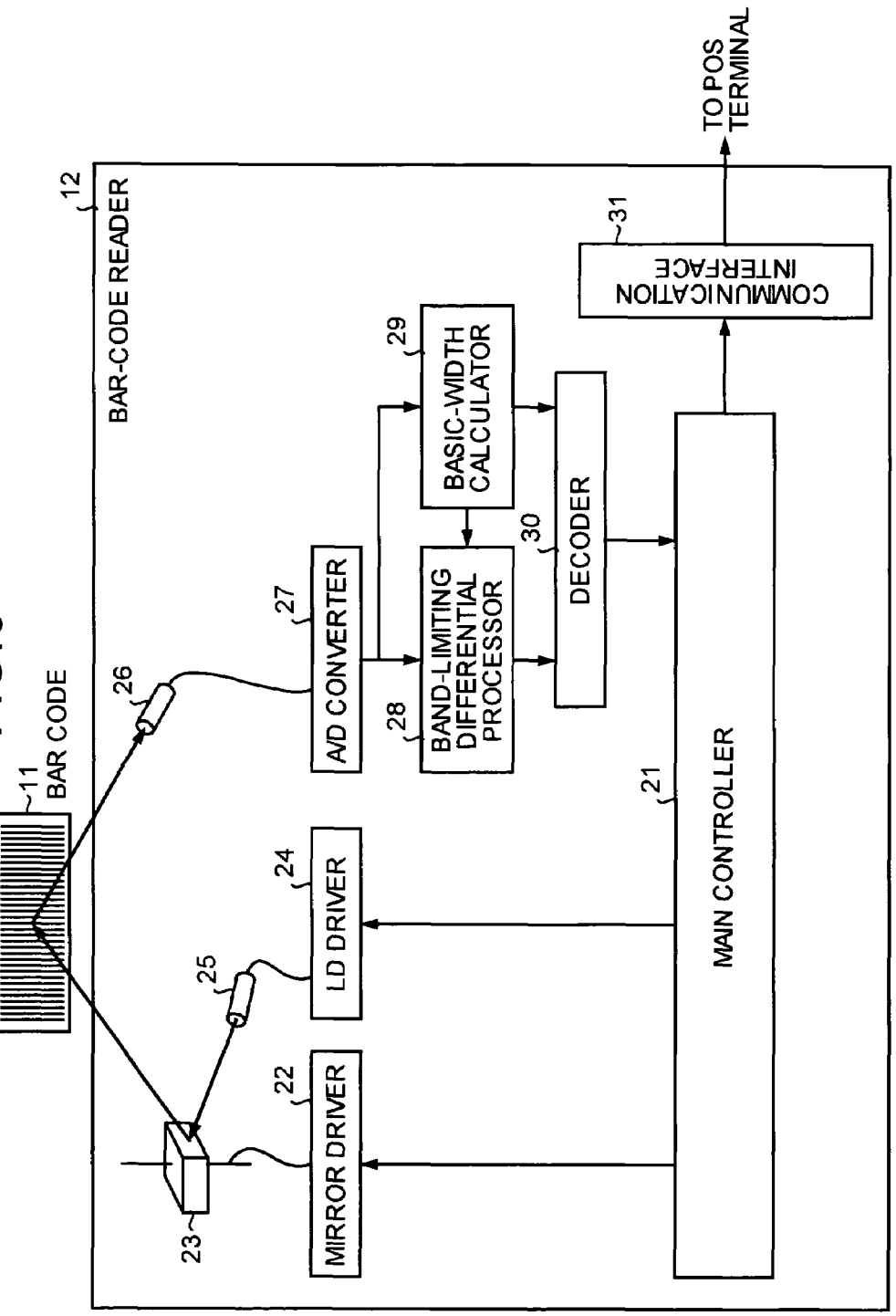
FIG. 3 is a schematic block diagram of a bar-code reader according this embodiment.

The bar-code reader according to this embodiment is described below. FIG. 3 is a schematic diagram of the bar-code reader according to this embodiment. As illustrated in FIG. 3, a bar-code reader 12 includes a main controller 21, a mirror driver 22, a polygon mirror 23, a laser diode (LD) 25, an LD driver 24, a photodiode 26, an analog/digital converter (A/D converter) 27, a band-limiting differential processor 28, a basic-width calculator 29, a decoder 30, and a communication interface 31.

The main controller 21 controls the bar-code reader 12. Concretely, the main controller 21 controls the mirror driver 22 and the LD driver 24 and scans a bar code 11. The main controller 21 also transmits character data that is received from the decoder 30 to a POS terminal via the communication interface 31.

The mirror driver 22 receives a control signal from the main controller 21 and rotates the polygon mirror 23. The LD driver 24 receives a control signal from the main controller 21 and emits a laser beam by operating the LD 25.

The laser beam that is emitted by the LD 25 is reflected from the polygon mirror 23 and is irradiated on the bar code 11. An irradiating position of the laser beam on the bar code 11 is changed by the rotation of the polygon mirror 23, thereby realizing scan of the bar code 11.

On the other hand, the laser beam that is reflected from the bar code 11 is converted to an analog electric signal by the photodiode 26. The A/D converter 27 converts the analog electric signal to a digital signal and transmits it to the band-limiting differential processor 28 and the basic-width calculator 29.

The basic-width calculator 29 calculates the basic width based on the digital signal that is output by the A/D converter 27 and transmits the calculated basic width to the band-limiting differential processor 28 and the decoder 30.

The band-limiting differential processor 28 differentiates the digital signal that is output by the A/D converter 27 in a band of frequencies not greater than the frequency of the basic width, by using the basic width that is calculated by the basic-width calculator 29.

In the digital signal that is output by the A/D converter 27, according to the scaling or reading position of a bar code and according to the inclination of a bar code, a frequency that is equivalent to the basic width can be a frequency over a wide range from a low frequency to a high frequency. However, while reading a bar code, the information that is required is widths of black bars and white bars and the widths of the black bars and the widths of the white bars are integral multiples of the basic width. Thus, the required information is indicated by (a number) that is not greater than the frequency of the basic width and a frequency that is not less than the basic width can be considered to be noise that is unnecessary for reading a bar code. Therefore, by differentiating the frequency that is not greater than the basic width of a bar code, frequency information is acquired upon eliminating the region of high frequency and a signal-to-noise ratio (hereinafter, "SN ratio") is improved. This also enables to reduce the processing load of differentiation.

The decoder 30 performs sampling by using band-limiting differential data that is output by the band-limiting differential processor 28 and the basic width that is output by the basic-width calculator 29, and acquires a peak value of amplitude of the band-limiting differential data. The decoder 30 reproduces an array of white bars and black bars in the bar code 11 from the peak value of amplitude. Further, the decoder 30 converts the bar code array to character data that is an array of numerals and alphabets, and transmits this character data to the main controller 21.

Figure 4:
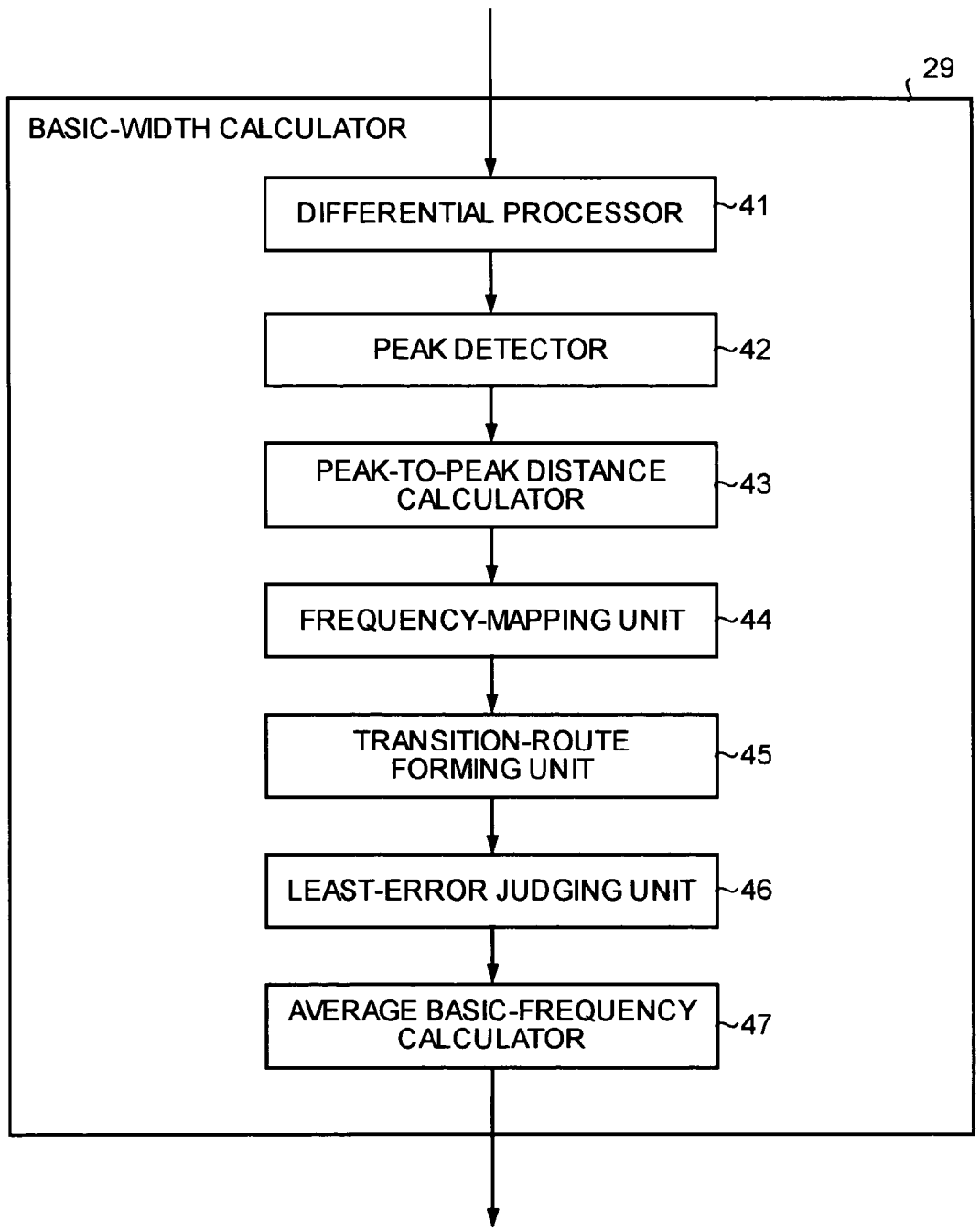
FIG. 4 is an illustration of configuration of a basic-width calculator.

FIG. 4 is an illustration of an internal configuration of the basic-width calculator 29. The basic width calculator 29 includes a differential processor 41, a peak detector 42, a peak-to-peak distance calculator 43, a frequency-mapping unit 44, a transition-route forming unit 45, a least-error judging unit 46, and an average basic-frequency calculator 47.

The differential processor 41 differentiates an analog signal that is output by the A/D converter 27 and creates differential data. The peak detector 42 detects a positive peak and a negative peak from the differential data. The peak-to-peak distance calculator 43 calculates a distance between the positive peak and the negative peak.

The frequency-mapping unit 44 calculates candidate values for the basic width corresponding to each peak-to-peak distance by dividing each peak-to-peak distance that is calculated by the peak-to-peak distance calculator 43 by a value that could be the possible width number. The frequency-mapping unit 44 forms a frequency table 50 of the candidate values for the basic width as shown in FIG. 5. As it is shown in FIG. 5, frequencies corresponding to width numbers from 2 to x for each peak-to-peak distance from $\Delta T1$ to $\Delta Tm-1$ are recorded in the frequency table 50.

In this case, the reason for not calculating the frequency corresponding to width number 1 in the frequency table 50 is as follows. The peak-to-peak distance is calculated separately as a positive peak and a negative peak. Therefore, a width number 2 in case of combining a width number 1 of a black bar and a width number 1 of a white bar becomes the least value of the peak-to-peak distance.

The value of the width number x may be set to be a maximum value based on regulations of bar code that is to be read. For example, in the bar-code regulations, if the maximum width numbers of black bars and white bars are 4 respectively, it gives better results if the width number x is set to 8, and if the maximum width numbers of the black bars and the white bars are 7 respectively, it gives better results if the width number x is set to 14.

Moreover, an upper limit and a lower limit may be set to the frequency value. If a large width number is assumed for a peak-to-peak distance for which the peak number is originally small, the candidate value for the basic width becomes a very small value and the frequency that corresponds to the width number becomes high. Whereas, if a small width number is assumed for a peak-to-peak distance for which the peak number is originally large, the candidate value for the basic width becomes a very large value and the frequency that corresponds with the width number becomes low. Therefore, an upper limit and a lower limit are set in advance to the frequency. By excluding the unsuitable values of frequency, the number of frequencies that are to be processed is reduced, thereby enabling to reduce the processing load.

Figure 6:
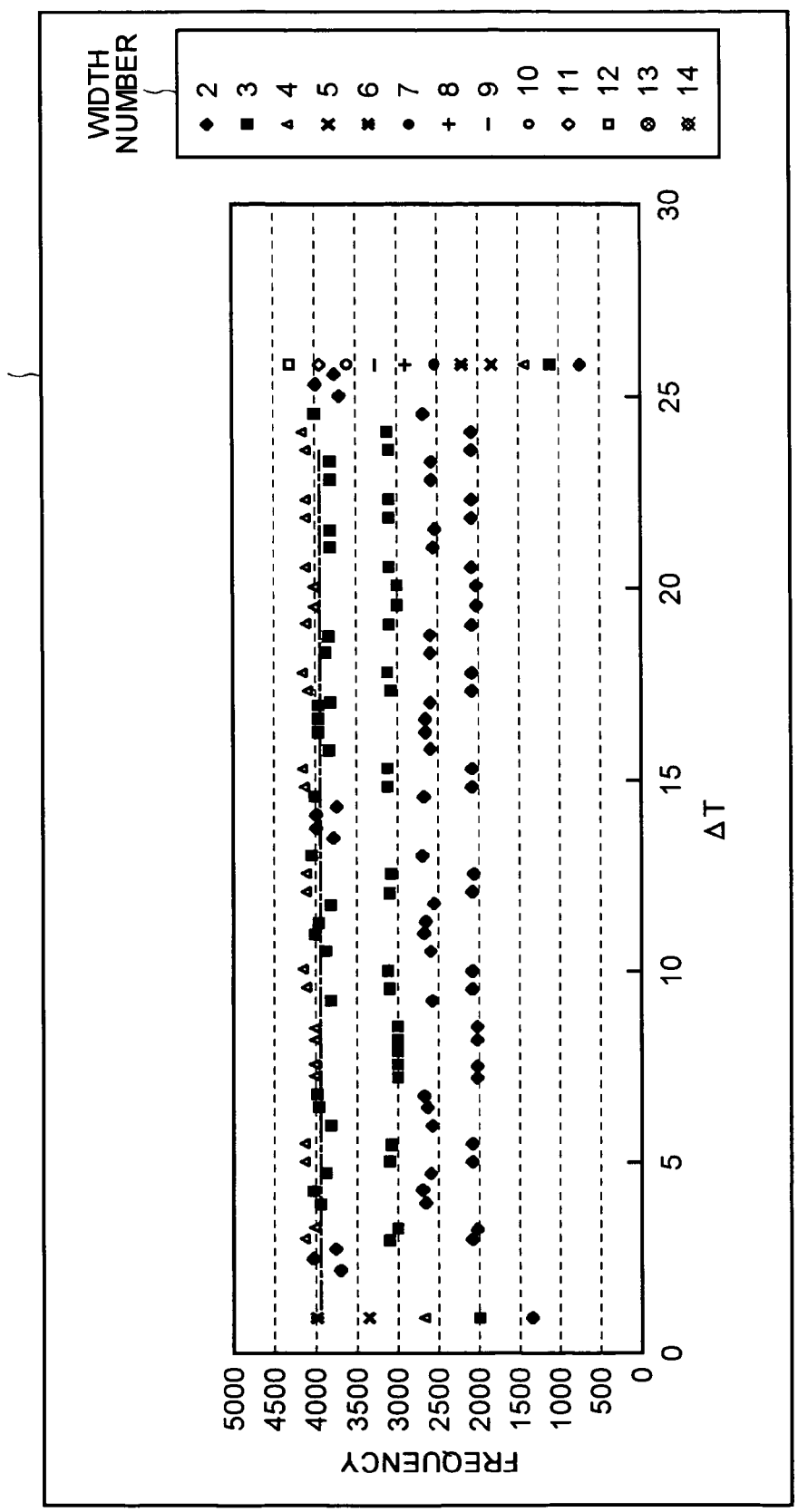
FIG. 6 is an illustration of a frequency map.

From the frequency table 50, the frequency-mapping unit 44 prepares a frequency map 51 as shown in FIG. 6. The frequency map 51 is a plot of frequencies corresponding to width numbers from 2 to 14 for each peak-to-peak distance.

Figure 7:
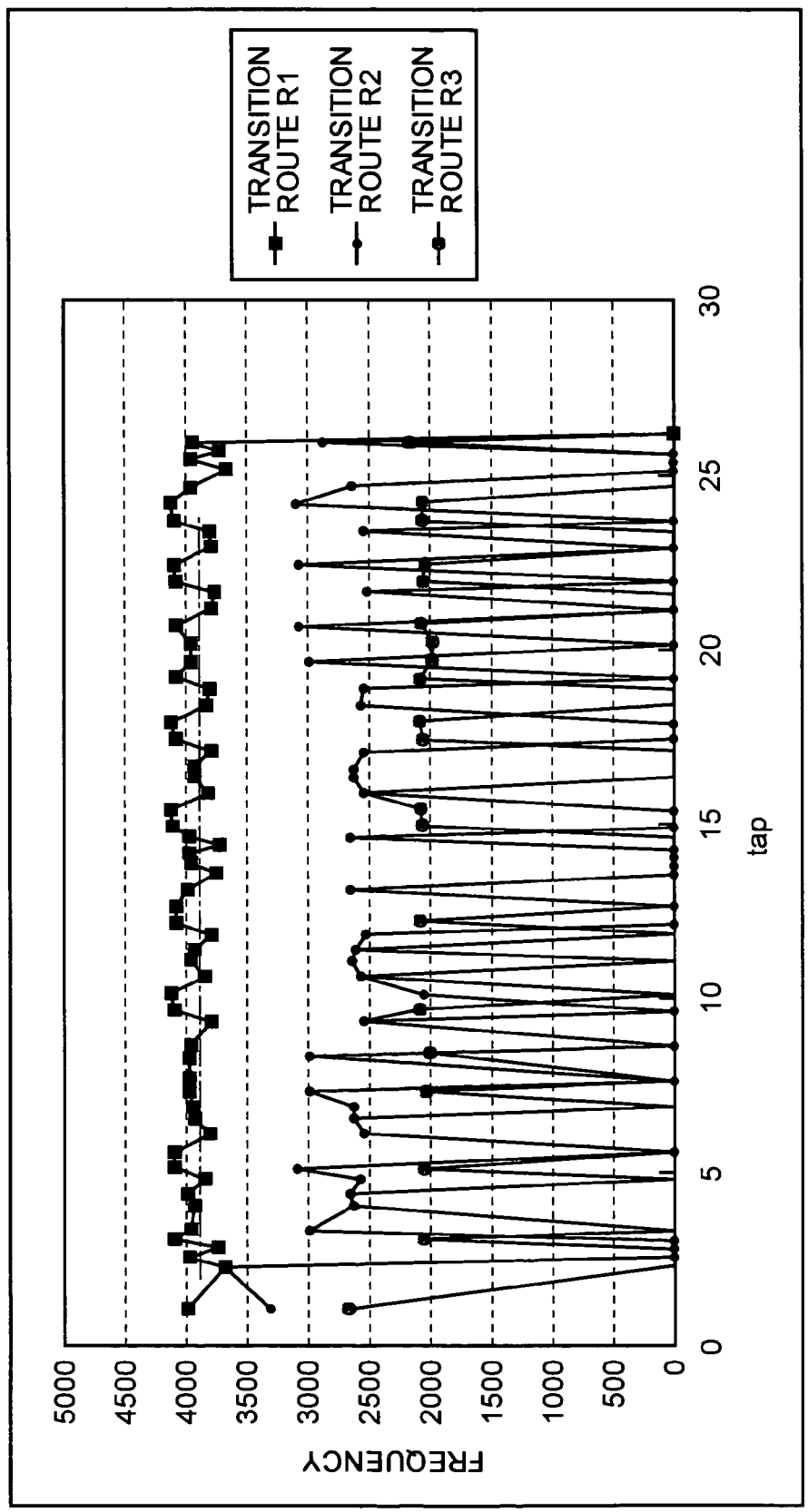
FIG. 7 is an illustration of transition routes.

The transition-route forming unit 45 forms a transition route from the frequency map 51. FIG. 7 is a graphical illustration of transition routes. Transition routes R1 to R3 are the routes among all the transition routes formed from the frequency map 51 with the smallest frequency errors.

Concretely, while forming the transition routes, the transition-route forming unit 45 selects a frequency corresponding to the width number 2 from a first peak-to-peak distance as an origin and then selects a frequency that is nearest to the frequency selected from a next peak-to-peak distance. Thus, the transition-route forming unit 45 forms transition routes by selecting a frequency that is nearest to a frequency selected from a peak-to-peak distance $\Delta T(x-1)$ from a peak-to-peak distance $\Delta Tx$. The transition-route forming unit 45 forms the transition routes one after another in a similar way by taking the respective width numbers of the first peak-to-peak distance as an origin.

While selecting a frequency from a certain peak-to-peak distance, either a frequency that is nearest to the value of a frequency selected from a previous peak-to-peak distance or a frequency that is nearest to an average value of frequencies that are selected in a plurality of peak-to-peak distance respectively may be selected.

Figure 8:
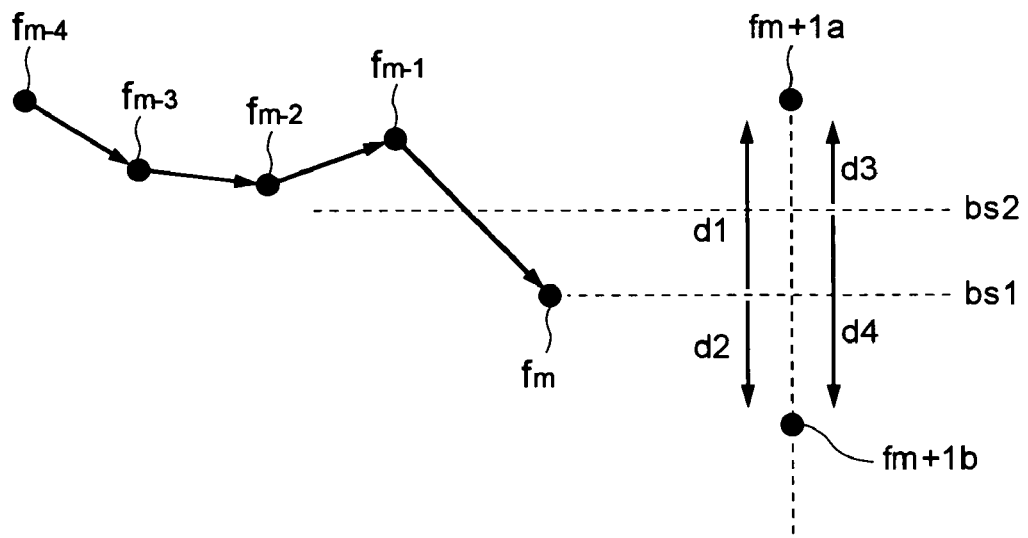
FIG. 8 is to explain a method of selection of frequency.

In FIG. 8, variation in methods of selection of frequency is illustrated. In FIG. 8, a transition route is undergoing transition through frequencies fm−4, fm−3, fm−2, fm−1, and fm. In a case of determining a next transition point of the frequency fm, if bs1 that is a value of the frequency fm is considered as a reference frequency, a distance d1 from bs1 to fm+1a is greater as compared to a distance d2 from bs1 to fm+1b. Therefore, while selecting the frequency, if a previous frequency is considered as a reference frequency, a transition from frequency fm to fm+1 takes place.

On the other hand, in a case of determining a point of transition subsequent to fm, if bs2 that is an average value of frequencies from fm−2 to fm, is considered as a reference frequency, a distance d3 from bs2 to fm+1a becomes greater as compared to a distance d4 from bs1 to fm+1b. Therefore, while selecting a frequency, if an average of a plurality of frequencies is considered as a reference value, a transition from frequency fm to frequency fm+1 takes place.

Thus, by determining the subsequent value of frequency with an average of a plurality of frequencies as a reference value, the frequency value changes gradually. This enables to prevent divergence from a value at the beginning of the transition route.

Figure 9:
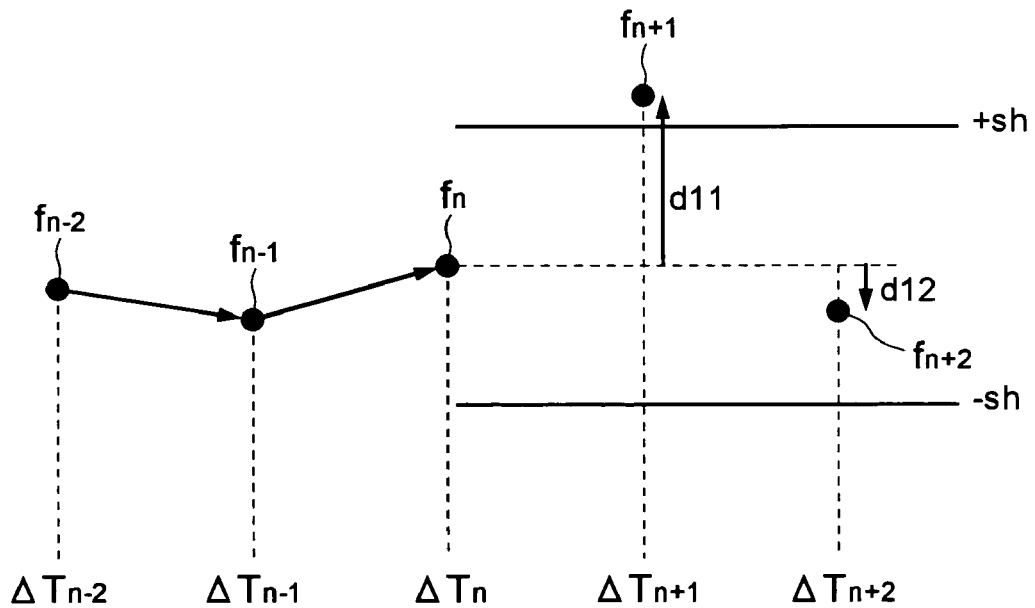
FIG. 9 is to explain a threshold value for selecting the frequency.

Moreover, while selecting the frequency, a frequency that is nearest to the reference value is selected. It is desirable to set a threshold value to a distance from the reference value and not to select a frequency that surpasses the threshold value. FIG. 9 is an illustration of a threshold value at the time of selection of the frequency. In FIG. 9, a frequency fn−2 is selected at peak-to-peak distance $\Delta Tn-2$, a frequency fn−1 is selected at a peak-to-peak distance ΔTn−1, and a frequency fn is selected at a peak-to-peak distance ΔTn.

However, in a subsequent ΔTn+1, a distance d11 up to a frequency fn+1 that is nearest to the reference value is greater than a threshold value sh. Therefore, fn+1 at Δtn+1 is not adopted and a frequency in ΔTn+2 is selected based on the same reference value. Since the distance d12 of frequency fn+2 nearest to the reference value in ΔTn+2 is not greater than the reference value, the frequency fn+2 is adopted.

Thus, while selecting a frequency, by setting a threshold value to a distance from the reference value, when there is no suitable value nearby, a transition to a frequency that differs greatly, is prevented.

When the threshold value is removed and when the value is not adopted, the value of the frequency is considered to be zero and an average of number of effective frequencies that are adopted while calculating the average, is considered. Moreover, while calculating the most suitable transition route from among the transition routes, numbers of effective frequencies that are less than a regular number (fixed number) are excluded from candidature. This enables to have sufficient number of frequencies and to select a transition route that has a small error.

Figure 10:
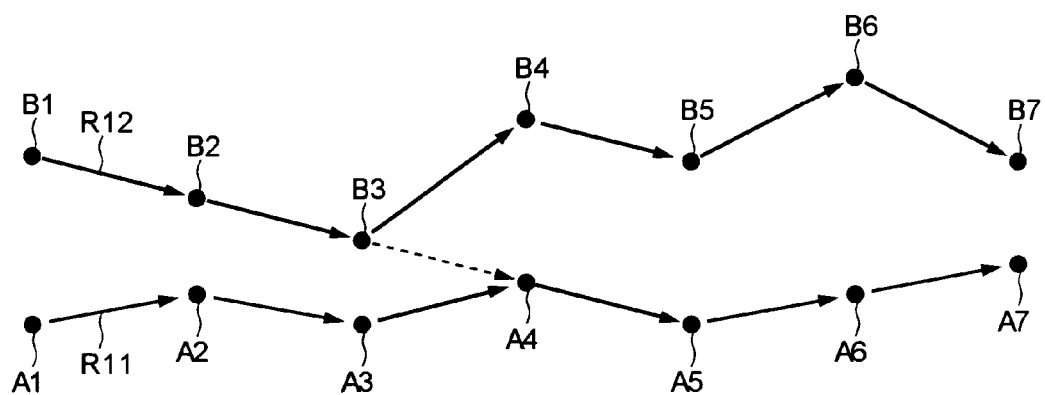
FIG. 10 is an illustration of forming of a transition route.

Furthermore, while forming a transition route, it is advisable to use single candidate value for the basic width for only a single combination pattern. FIG. 10 is an illustration of an example of a transition-route formation. A transition route R11 has a frequency A1 as an origin and undergoes transitions to frequencies A2, A3, A4, A5, A6, and A7 one after another. On the other hand, in a transition route R12, transition to frequencies B2 and B3 takes places with frequency B1 as an origin. In this case, a nearest frequency next to the frequency B3 is A4. However, if a transition from the frequency B3 to the frequency A4 takes place, the same transition as the transition route R11 occurs subsequently. As a result, in spite of considering the frequency B1 as an origin, almost the same basic frequency as in a case of the frequency A1 as origin is output. Therefore, it is not possible to calculate the suitable basic width by the assumption of a width number, which is the original object.

Therefore, the selection of the frequency that is used in the transition route R11 is not allowed and in the transition route R11, by causing a transition from the frequency B3 to the frequency B4, it is possible to form suitably a plurality of transition routes.

Thus, the transition-route forming unit 45 forms a plurality of transition routes. The least-error judging unit 46 calculates errors in frequencies in each of the transition routes and judges a route for which the error in frequency is the least, as the most suitable combination pattern. In the transition routes R1 to R3 that are shown in FIG. 7, since the transition route R1 has the least error in frequencies, the least-error judging unit 46 transmits the transition route R1 to the average basic-frequency calculator 47 as the most suitable combination pattern.

The average basic-frequency calculator 47 calculates an average value of all frequencies in the most suitable combination pattern, i.e. the transition route R1 as the average basic frequency. Moreover, the average basic-frequency calculator 47 transmits the reciprocal of the average basic frequency as the basic width, to the band-limiting differential processor 28 and the decoder 30.

Thus, in the bar-code reader according to the present embodiment, the scan result of the bar code 11 is differentiated and the peak-to-peak distance is calculated from the differential data. The frequency table 50 is prepared by assuming the widths acquires by respective peak-to-peak distances. The frequency map 51 is prepared from the frequency table 50. A transition route for which the error is the least is retrieved from the frequency map 50 and an average value of frequencies in this transition route is adopted as the basic frequency. This enables to calculate the basic width of a bar code accurately thereby improving the accuracy of reading of a bar code and widening the range of possible reading of a bar code.

Thus, according to the present invention it is possible to calculate the basic width of a bar code accurately, thereby improving the accuracy of reading of a bar code and widening the range of possible reading of a bar code.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A bar-code reader that scans a bar code that is formed by black bars and white bars each having a width that is an integral multiple of a basic width, comprising:

a differential processing unit that calculates differential of a signal obtained by optically scanning the bar code to thereby obtain a differential data;

a peak detector that detects peaks in the differential data;

a peak-to-peak distance calculating unit that calculates peak-to-peak distances for all the peaks detected, the peak-to-peak distance being a distance between two adjacent peaks;

a frequency-mapping unit that calculates, for each of the peak-to-peak distances, candidate values for the basic width by dividing the corresponding one of the peak-to-peak distance by each of a plurality of integral numbers that are possible candidates for the integral numbers respectively;

a transition-route forming unit that selects, based on a predetermined criteria, a candidate value for the basic width corresponding to each of the peak-to-peak distances to thereby form a combination pattern for each candidate values of the basic width; and an error judging unit that judges an mount of error in each of the combination patterns, and determines a combination pattern, as a candidate combination pattern, having least amount of error from among the combination patterns;

a basic-width determining unit that calculates the basic width from the candidate values for the basic width in the candidate combination pattern.

2. The bar-code reader according to claim 1, wherein the predetermined criteria is to select a candidate value corresponding to a peak-to-peak distance in question such that the candidate value selected is nearest to a candidate value selected corresponding to a peak-to-peak distance that is adjacent to the peak-to-peak distance in question.

3. The bar-code reader according to claim 1, wherein the predetermined criteria is to select a candidate value corresponding to a peak-to-peak distance in question such that the candidate value selected is nearest to an average value of candidate values selected corresponding to a plurality of peak-to-peak distances that are adjacent to the peak-to-peak distance in question.

4. The bar-code reader according to claim 1, wherein the predetermined criteria is to judge whether an error with candidate values for the basic width that are selected from other group of candidate values of the basic group is within a threshold value and adopts a candidate value that is within the threshold value as an effective candidate value for the basic width.

5. The bar-code reader according to claim 4, wherein the error judging unit selects a combination pattern, from the combination patterns, as the candidate combination pattern, that include not less than a predetermined number of effective candidate values for the basic width.

6. The bar-code reader according to claim 1, wherein the frequency-mapping unit discards candidate values calculated that are not less than an upper threshold and that are not greater than a lower threshold.

7. The bar-code reader according to claim 1, wherein the frequency-mapping unit discards the possible candidates for the integral numbers that are not less than an upper threshold and that are not greater than a lower threshold.

8. The bar-code reader according to claim 1, wherein while forming the combination pattern the transition-route forming unit uses a single value of the candidate value for the basic width only in a single combination pattern.

9. The bar-code reader according to claim 1, wherein the transition-route forming unit forms on priority basis a combination pattern that includes a candidate value for the basic width when the multiple is 2.

10. A method of reading a bar code by scanning the bar code that is formed by black bars and white bars each having a width that is an integral multiple of a basic width, comprising:

calculating differential of a signal obtained by optically scanning the bar code to thereby obtain a differential data;

detecting peaks in the differential data;

calculating peak-to-peak distances for all the peaks detected, the peak-to-peak distance being a distance between two adjacent peaks;

calculating, for each of the peak-to-peak distances, candidate values for the basic width by dividing the corresponding one of the peak-to-peak distance by each of a plurality of integral numbers that are possible candidates for the integral numbers respectively;

selecting, based on a predetermined criteria, a candidate value for the basic width corresponding to each of the peak-to-peak distances to thereby form a combination pattern for each candidate values of the basic width;

judging an mount of error in each of the combination patterns, and determining a combination pattern, as a candidate combination pattern, having least amount of error from among the combination patterns;

calculating the basic width from the candidate values for the basic width in the candidate combination pattern.

11. The method according to claim 10, wherein the predetermined criteria is to select a candidate value corresponding to a peak-to-peak distance in question such that the candidate value selected is nearest to a candidate value selected corresponding to a peak-to-peak distance that is adjacent to the peak-to-peak distance in question.

12. The method according to claim 10, wherein the predetermined criteria is to select a candidate value corresponding to a peak-to-peak distance in question such that the candidate value selected is nearest to an average value of candidate values selected corresponding to a plurality of peak-to-peak distances that are adjacent to the peak-to-peak distance in question.

13. The method according to claim 10, wherein the predetermined criteria is to judge whether an error with candidate values for the basic width that are selected from other group of candidate values of the basic group is within a threshold value and adopts a candidate value that is within the threshold value as an effective candidate value for the basic width.

* * * * *